(12) United States Patent
Krzanowski et al.

(10) Patent No.: US 8,861,371 B2
(45) Date of Patent: Oct. 14, 2014

(54) SERVICE STATUS SIGNALING IN ETHERNET NETWORKS

(75) Inventors: Roman Krzanowski, White Plains, NY (US); Te Sheng Lin, Cresskill, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 318 days.

(21) Appl. No.: 13/301,057

(22) Filed: Nov. 21, 2011

(65) Prior Publication Data

US 2013/0128749 A1     May 23, 2013

(51) Int. Cl.
*H04W 4/00* (2009.01)
*H04L 12/26* (2006.01)
*H04L 12/28* (2006.01)
*G06F 11/07* (2006.01)
*H04L 12/24* (2006.01)

(52) U.S. Cl.
CPC .................................. *H04L 41/0213* (2013.01)
USPC ..................... 370/241; 370/236.2; 370/395.5; 370/225

(58) Field of Classification Search
CPC ..................................................... H04L 43/0811
USPC ................. 370/241.1, 225, 242, 236.2, 395.5
See application file for complete search history.

(56) References Cited

U.S. PATENT DOCUMENTS

| | | | |
|---|---|---|---|
| 2007/0140126 A1* | 6/2007 | Osswald et al. | 370/236.2 |
| 2009/0168783 A1* | 7/2009 | Mohan et al. | 370/395.5 |
| 2010/0061230 A1* | 3/2010 | Xiong et al. | 370/225 |

* cited by examiner

*Primary Examiner* — Ian N Moore
*Assistant Examiner* — Kiet Tang (57) ABSTRACT

A method may include receiving, by a first Ethernet interface, a message from a remote second Ethernet interface via an Ethernet operation, administration, or management (OAM) channel. The first Ethernet interface may determine whether the message includes a request for status information regarding an identified higher layer service. The first Ethernet interface may determine, in response to the message, a current status of the identified higher layer service. A response message may be generated to include the current status. The response message is transmitted from the first Ethernet interface to the remote second Ethernet interface via the Ethernet OAM channel.

11 Claims, 8 Drawing Sheets

| HIGHER LAYER SERVICES TABLE 600 | | |
|---|---|---|
| SERVICE TYPE 604 | HOST IDENTIFIER 606 | STATUS 608 |
| 65 | 205.34.214.254:80 | IN-SERVICE |
| 62 | 192.168.1.123:7645 | OUT-OF-SERVICE |
| 219 | 192.168.10.234:23 | IN-SERVICE |
| ... | ... | ... |
| 198 | 10.23.432.123:5400 | IN-SERVICE |

| MEL 702 | Version 706 | OpCode 708 | Flags 710 | TLV Offset 712 |
|---|---|---|---|---|
| | Host ID 713 | | TLV 714 | |
| End TLV (0) 716 | | | | |

| Type 718 | Length 720 | Value 722 |
|---|---|---|

TLV 714

SERVICE STATUS SIGNALING IN ETHERNET NETWORKS

BACKGROUND INFORMATION

In recent years, carrier-class Ethernet has emerged as a significant technology with respect to transport of traffic over Metro Area Networks (MANs). For example, in the United States, the demand for Ethernet services is expected to increase at a compound annual growth rate (CAGR) of over 20%. Such growth and increasing demand are partly driven by the need for higher bandwidth for site-to-site and data center connectivity, scalability, performance, and security.

Carrier-class Ethernet networks have been developed to leverage Ethernet technology to service provider networks that may include a number of individual operator networks. Carrier-class Ethernet networks include Ethernet virtual connections (EVCs) established between endpoints on the network. Such EVCs make a network that includes multiple sub-networks appear as a single network to customer devices.

Modern communications networks use a layered network model referred to as the Open Systems Interconnection (OSI) model to define various functions within the network architecture in terms of abstraction layers. Carrier-class Ethernet networks rely on an Ethernet transport mechanism to perform data transmission for higher level services through the network.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may facilitate exchange of higher layer service status information via a lower layer communication channel, such as a layer 2 operations, administration, and maintenance (OAM) communications channel.

In one implementation, specific OAM messages relating to higher layer status information may be generated and deciphered to initiate requests for and provision of status information for identified higher layer services. Layer 2 end point devices, upon receipt of a status request message, may query the identified higher layer service (or a table including service status information) to determine the status of the identified service. This information may then be encapsulated into a layer 2 OAM message and transmitted back to the requesting layer 2 requesting end point device. In some implementations, higher layer status messages may be generated as unsolicited notifications for forwarding status information regarding higher layer services from one end point device to another.

Figure 1:
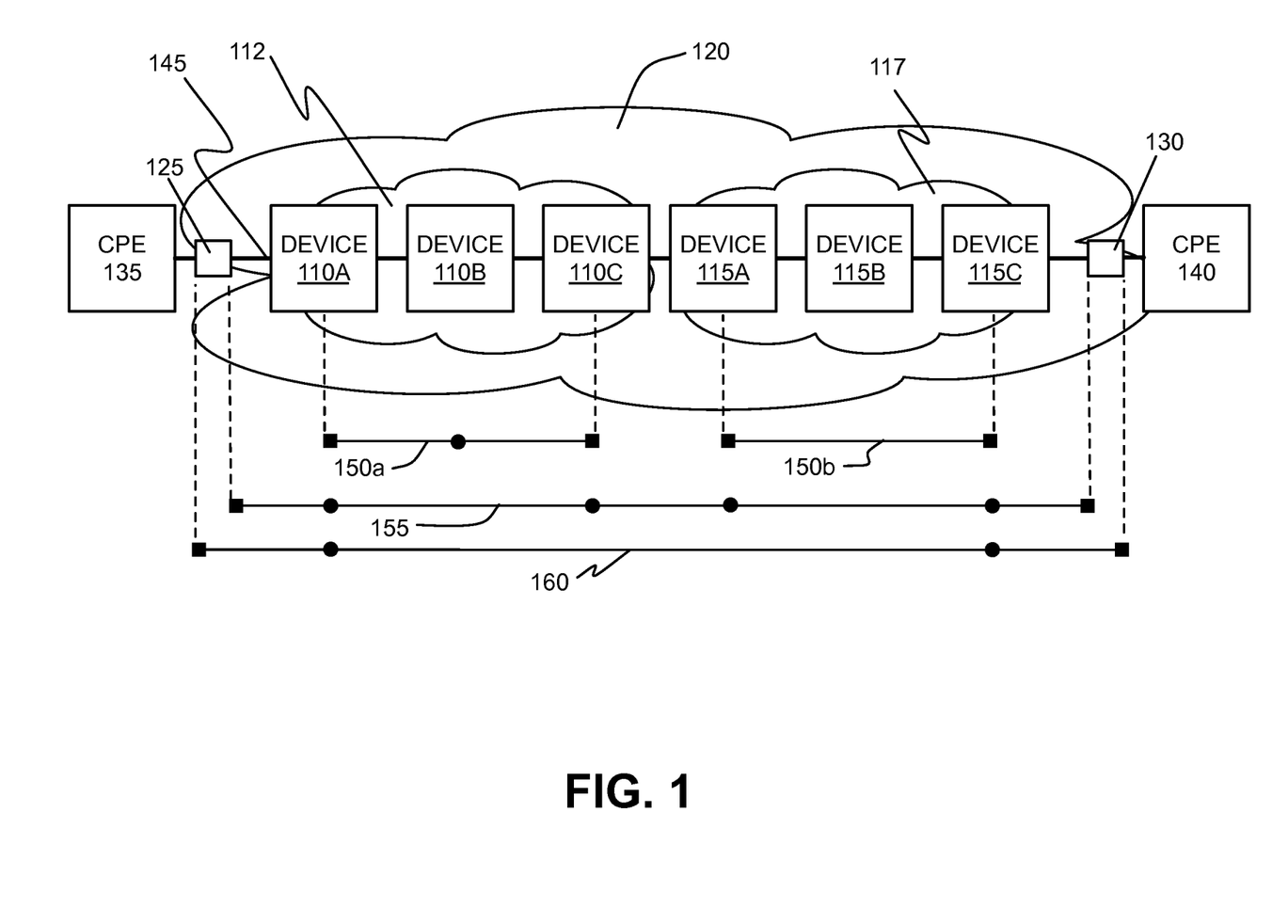
FIG. 1 depicts an exemplary network in which systems and methods described herein may be implemented.

FIG. 1 depicts an exemplary network 100 in which systems and methods described herein may be implemented. Network 100 may include first operator-level network devices 110A to 110C (collectively "first operator network devices 110" and individually "first operator network device 110") that collectively form a first operator network 112. Second operator-level network devices 115A to 115C (collectively referred to as "second operator-level network devices 115" or individually referred to as second operator-level network device 115) may collectively form a second operator network 117. A provider network 120 may include first operator network 112 and second operator network 117.

Provider network 120 may be coupled, at a first end, to near-end interface 125 and, at a second end, to far-end interface 130. Each of near-end interface 125 and far-end interface 130 may be coupled, respectively, to customer premises equipment (CPE) 135 and CPE 140. Consistent with embodiments described herein, connections between interfaces 125 and 130 may be referred to as a link 145. For example, link 145 may include a point-to-point Ethernet connection and/or an Ethernet Virtual Channel (EVC).

In one implementation, provider network 120 may include metro Ethernet networks (MENs), network-to-network interfaces (NNIs) between the MENs, Synchronous Optical Network (SONET) network rings that are interconnected by long-haul optical lines, additional network elements (e.g., routers, switches, etc.), servers, client devices, wireless devices, etc.

Provider network 120 may also include optical fibers/non-optical lines and central office hubs that are interconnected by the fibers/lines. The optical fibers and the lines may form the backbone of provider network 120. The central office hubs may provide telecommunication services to subscribers, such as telephone service, access to the Internet, cable television programs, etc., via line terminals. Each central office hub may house telecommunication equipment, including switches (e.g., Ethernet switches), optical line terminals, etc.

Although only six operator network devices 110/115, two operator networks 112/117, two interface devices 125/130, and two CPEs 135/140 have been illustrated as being included within or connected to provider network 120 for simplicity, in practice, there may be more or fewer connected devices.

Interfaces 125/130 may each include a physical interface that is a demarcation point between a subscriber (e.g., CPEs 135/140) and a service provider (e.g., service provider network 120). Accordingly, interfaces 125/130 are typically provided by a service provider/carrier and may be capable of supporting one or more bandwidths, such as 10 Mbps, 100 Mbps, 1 Gbps, 10 Gbps, etc.

In the example of FIG. 1, interface 125 may form EVC 145 over provider network 120 with interface 130. Interfaces 125/130 may form different types of EVCs, such as a point-to-point EVC, multipoint to multipoint EVC, point to multipoint EVC, etc. Multiple EVCs may be bundled within an interface or multiplexed on the same interface. Each EVC may carry a single Class of Service (CoS) channel, or alternatively, carry multiple channels of different CoSs (e.g., Ethernet Virtual Private Line (EVPL)-Real Time (RT), EVPL-basic (B), EVPL-Priority Data (PD), etc.).

Each operator network device 110/115 may include switches, routers, and/or other network devices. Some of these devices may provide support for Ethernet services (e.g., Cisco 6509 Switch).

Consistent with implementations described herein, operator network devices 110/115, and/or interfaces 125/130 (or devices included within interfaces 125/130) may form maintenance entities (MEs) that may be managed in relation to EVC 135 pursuant to the Telecommunication Standardization Section of the International Telecommunication Union (ITU) Y.1731 (February 2008), Amendment 1 (July 2010) (referred to herein as "the Y.1731 standard"). As defined in the Y.1731 standard, ME groups (MEGs) may be configured at various levels within provider network 120 to facilitate management and maintenance of various portions of network 120. These levels may be indicated by a MEG level (MEL) indication included in Y.1731-related messages.

For example, as shown in FIG. 1, a first MEG 150a may be defined to include first operator network devices 110. A second MEG 150b may be defined to include second operator network devices 115. MEGs 150a and 150b may be considered operator domain level MEGs, since each MEG 150a and 150b begins and ends within operator networks 112/117, respectively. A third MEG 155 may be defined to include both first operator network devices 110 and second operator network devices 115. MEG 155 may be considered as a provider domain level MEG, since MEG 155 begins and ends within provider network 120. A fourth MEG 160 may be defined to include first operator network devices 110, second operator network devices 115, and interfaces 125 and 130. MEG 160 may be considered as a customer domain level MEG. As shown in FIG. 1, MEG 160 corresponds to EVC 145.

Each MEG 150a-160 includes MEG end points (MEPs) and may include one or more MEG intermediate points (MIPs) depending on a number of devices in the MEG. MEPs mark the end point of a particular MEG and are capable of initiating and terminating operations, administration, and maintenance (OAM) messages relating to the particular MEG. As described further below, MEPs may include server layer functionality for initiating and receiving OAM messages.

Contrary to MEPs, MIPs constitute intermediate points in a MEG, which are capable of reacting to some OAM messages. However, for a particular MEG, included MIPs do not initiate OAM messages. As shown in FIG. 1, for each respective MEG 150a-160, some devices may perform both MEP and MIP functions. For example, in MEG 150a, first operator network devices 110A and 110C may perform MEP functions, since these devices represent the end points for MEG 150a. However, for MEG 160, devices 110A and 115C may perform MIP functions and interfaces 125 and 130 may perform MEP functions.

Figure 2:
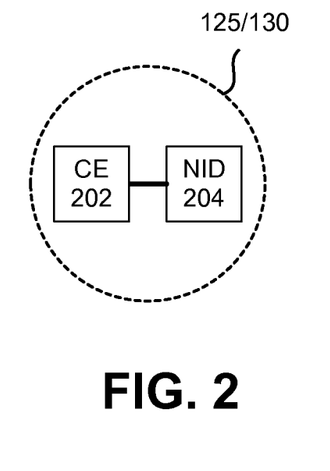
FIG. 2 depicts an exemplary network device configured to communicate via the exemplary network illustrated in FIG. 1.

FIG. 2 is a diagram of exemplary components of interface 125 and/or interface 130. As shown, interfaces 125/130 may include a customer edge (CE) device 202 and a network interface device (NID) 204. Depending on the implementation, interfaces 125/130 may include fewer, additional, or different devices than those illustrated in FIG. 2. For example, in one implementation, interfaces 125/130 may include only NID 204. In another implementation, interfaces 125/130 may include CE device 202, NID 204, and an Ethernet switch.

CE device 202 may provide an entry/exit to/from a customer network, and typically may be located in a customer's premises (e.g., office, apartment, house, etc.). Examples of CE device 202 include a router, modem, firewall, etc. In FIG. 2, CE device 202 may provide the customer-side functions of interfaces 125/130 (e.g., client side user to network interface (UNI-C)) and NID 204 may provide the network or provider-side functions (e.g., network side user to network interface (UNI-N)).

NID 204 may include a device that provides a service provider/carrier's functions of interfaces 125/130. In a different implementation, NID 204 may provide for other functions that are associated with interfaces 125/130. Examples of NID 204 include a telephone network interface (TNI), an optical network terminal (ONT), wiring terminals, etc.

Consistent with embodiments described herein, MEP server functionality may be incorporated into either or both of CE device 202 and/or NID 204. For example, MEG 160 may include a first MEP CE device 202 (e.g., a router or Ethernet switch) at near end interface 125 and a second MEP CE device 202 at far end interface 130. In this embodiment, near end and far end NIDS 204 may include MIP functionality in relation to MEG 160.

Figure 3:
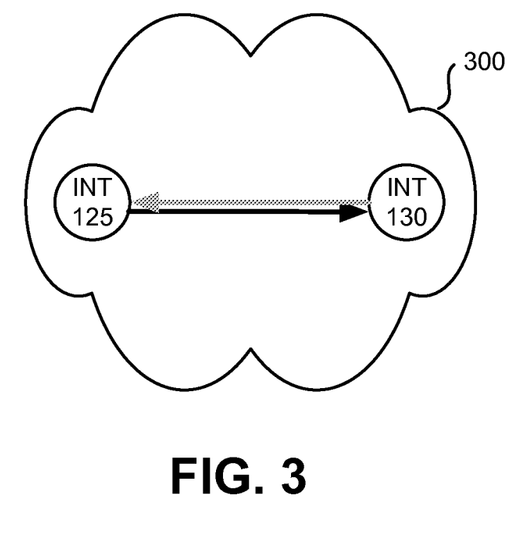
FIG. 3 is a block diagram of an exemplary Ethernet Virtual Connection (EVC)

FIG. 3 is a diagram of an exemplary point-to-point EVC 300. As shown, point-to-point EVC 300 may include Ethernet interface 125 and Ethernet interface 130. In a point-to-point EVC (also called E-Line), one Ethernet interface (e.g., interface 125) may connect directly to another Ethernet interface (e.g., interface 130). In some implementations, a point-to-point EVC may include an Ethernet private line (EPL), and in other implementations, may include Ethernet Virtual private line (EVPL).

Figure 4A:
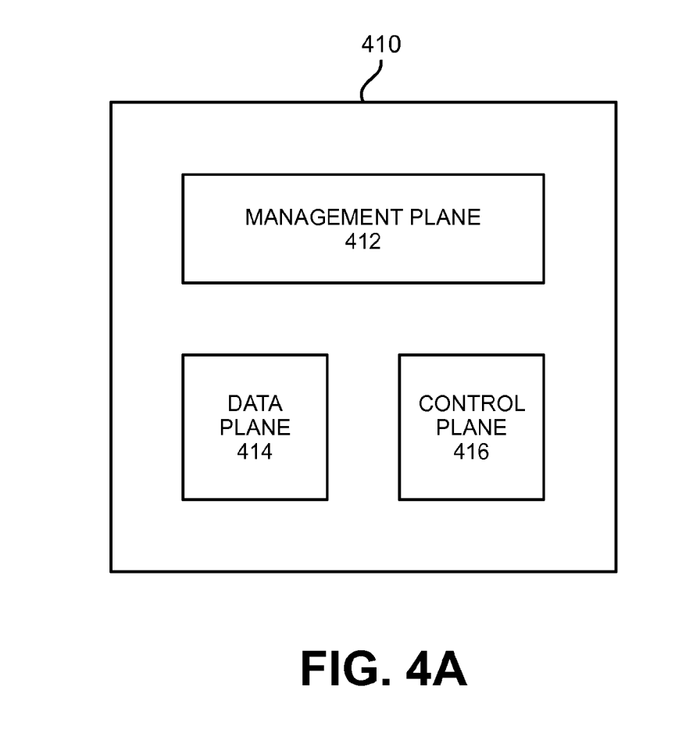
FIG. 4A is a block diagram of exemplary functional and/or structural components of network elements of FIG. 1, 2, or 3.

FIG. 4A is a block diagram of exemplary functional and/or structural components of network elements of FIG. 1, 2, or 3. For example, network element 410 may represent interface 125, interface 130, operator network devices 110/115, CE devices 202, or NIDs 204. As shown in FIG. 4A, network element 410 may include a management plane 412, data plane 414, and control plane 416. Depending on the implementation, network element 410 may include additional, fewer, or different components than those illustrated in FIG. 4A. For example, in some implementations, network element 410 may not include control plane 416.

Management plane 412 may include hardware and/or software components for supporting operation, administration, and management (OAM) functions. For example, as described below, management plane 412 may support communication with CPEs 135/140 regarding the status of layer 3 or higher network services running on EVC 145 configured therebetween, and may further support configuration, generation, and handling of OAM messages.

Data plane 414 may include hardware/software components for processing data. In some implementations, such as routers, data plane 414 may forward data to their destinations in provider network 120. Examples of data plane 414 may include an Ethernet card, line card of a router, packet processing engine on the line card, forwarding information base (FIB), etc.

Control plane 416 may include hardware/software components for exchanging signaling information between a network device 410 and another network element. This information may include routing information in accordance with a specific protocol, traffic engineering information, etc.

Figure 4B:
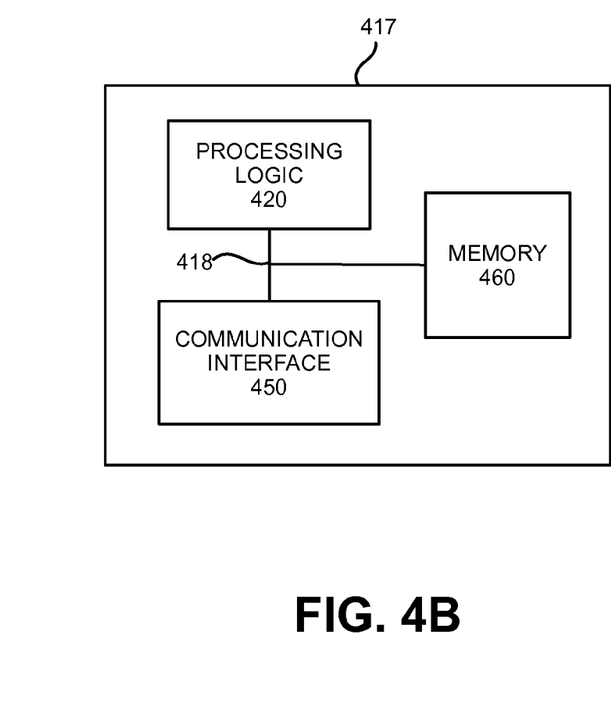
FIG. 4B is a block diagram of exemplary components of a computing module.

Network devices shown in FIGS. 1, 2, and/or 3 may each include one or more computing modules (e.g., each plane in network device 410 may include a computing module). FIG. 4B is a block diagram of exemplary components of a computing module 417. Computing module 417 may include a bus 418, processing logic 420, a communication interface 450, and a memory 460. Computing module 417 may include other components (not shown) that aid in receiving, transmitting, and/or processing data. Moreover, other configurations of components in computing module 417 are possible.

Bus 418 may include a path that permits communication among the components of computing module 417. Processing logic 420 may include any type of processor or microprocessor (or families of processors or microprocessors) that interprets and executes instructions. In other embodiments, processing logic 420 may include an application-specific integrated circuit (ASIC), a field-programmable gate array (FPGA), etc.

Communication interface 450 may include a transceiver that enables computing module 417 to communicate with other devices or systems. Communication interface 450 may include a transmitter and/or a receiver. Memory 460 may store, among other things, information and instructions (e.g., applications and an operating system) and data (e.g., application data) for use by processing logic 420. Memory 460 may include a random access memory (RAM) or another type of dynamic storage device, a read-only memory (ROM) device or another type of static storage device, and/or some other type of magnetic or optical recording medium and its corresponding drive (e.g., a hard disk drive).

Computing module 417 may perform the operations described herein in response to processing logic 420 executing software instructions stored in a computer-readable medium, such as memory 460. A computer-readable medium may include a physical, logical, tangible, and/or non-transient memory device. The software instructions may be read into memory 460 from another computer-readable medium or from another device via communication interface 450. The software instructions stored in memory 460 may cause processing logic 420 to perform processes that are described herein.

Figure 5:
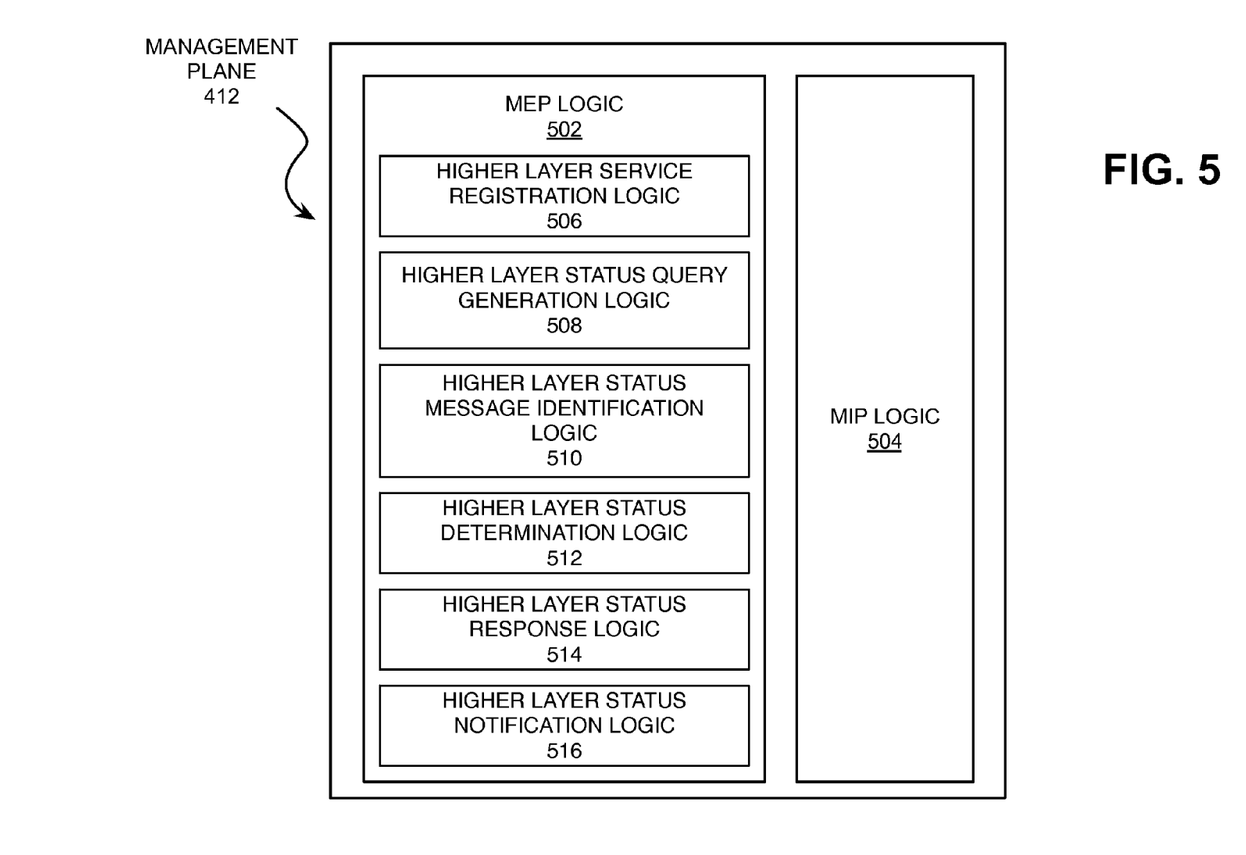
FIG. 5 is a block diagram of exemplary components of a management plane of a network element of FIG. 4.

FIG. 5 is a block diagram of exemplary components of management plane 412 of network element 410. As shown, management plane 412 may include MEP logic 502 and MIP logic 504. As described above, depending on a position within a MEG, different network elements 410 may take have different roles within a group. MEP logic 502 may include logic for generating, terminating, identifying, and responding to Ethernet OAM messages. Consistent with embodiments described herein, MEP logic 502 may include higher layer service registration logic 506, higher layer status query generation logic 508, higher layer status message identification logic 510, higher layer status determination logic 512, higher layer status response logic 514, and higher layer status notification logic 516.

MIP logic 504 may be configured to identify, forward, and respond to Ethernet OAM messages. Unlike MEP logic 502, MIP logic 504 is not configured to generate or terminate Ethernet OAM messages.

Although management plane 412 may include additional components, other components are not illustrated for simplicity. In addition, depending on the implementation, a single functional block in FIG. 5 may be implemented as multiple blocks or components.

Consistent with embodiments described herein, higher layer service registration logic 506 may be configured to register higher layer services for host devices associated with a particular network device 410, such as first MEP CE device 202 at near end interface 125. For example, higher layer service registration logic 506 may be configured to identify higher layer services, e.g., layer 3 or higher services running on the EVC 145, such as Internet Protocol (IP) services (layer 3), transmission control protocol (TCP) services (layer 4), user datagram protocol (UDP) services (layer 4), hypertext transport protocol (http) services (layer 7), etc.

In one implementation, higher layer service registration logic 506 may be configured to identify higher layer services by monitoring traffic forwarded or router through CE device 202, e.g., by performing deep packet inspection, etc. Upon identification of a particular service, higher layer service registration logic 506 may add or identify an entry in a higher layers services table. An exemplary entry may include an indication of a service type (e.g., a unique service type identifier), a host device identifier, such as an Internet Protocol (IP) or media access control (MAC) address associated with a host device running the service, and a status indicator, identifying a current status of the service, such as in service or out-of-service status.

In another exemplary embodiment, higher layer service registration logic 506 may be configured to receive registration information from host devices upon start up or provisioning of each respective service, e.g., as part of a server daemon executing on each host device. In such an embodiment, the host devices may transmit the above-identified information to higher layer service registration logic 506 for inclusion in the higher layer services table. In addition, the server daemon executing on each host device may also be configured to notify higher layer service registration logic 506 upon the termination of the service, such as during shut-down, restart, etc.

Figure 6:
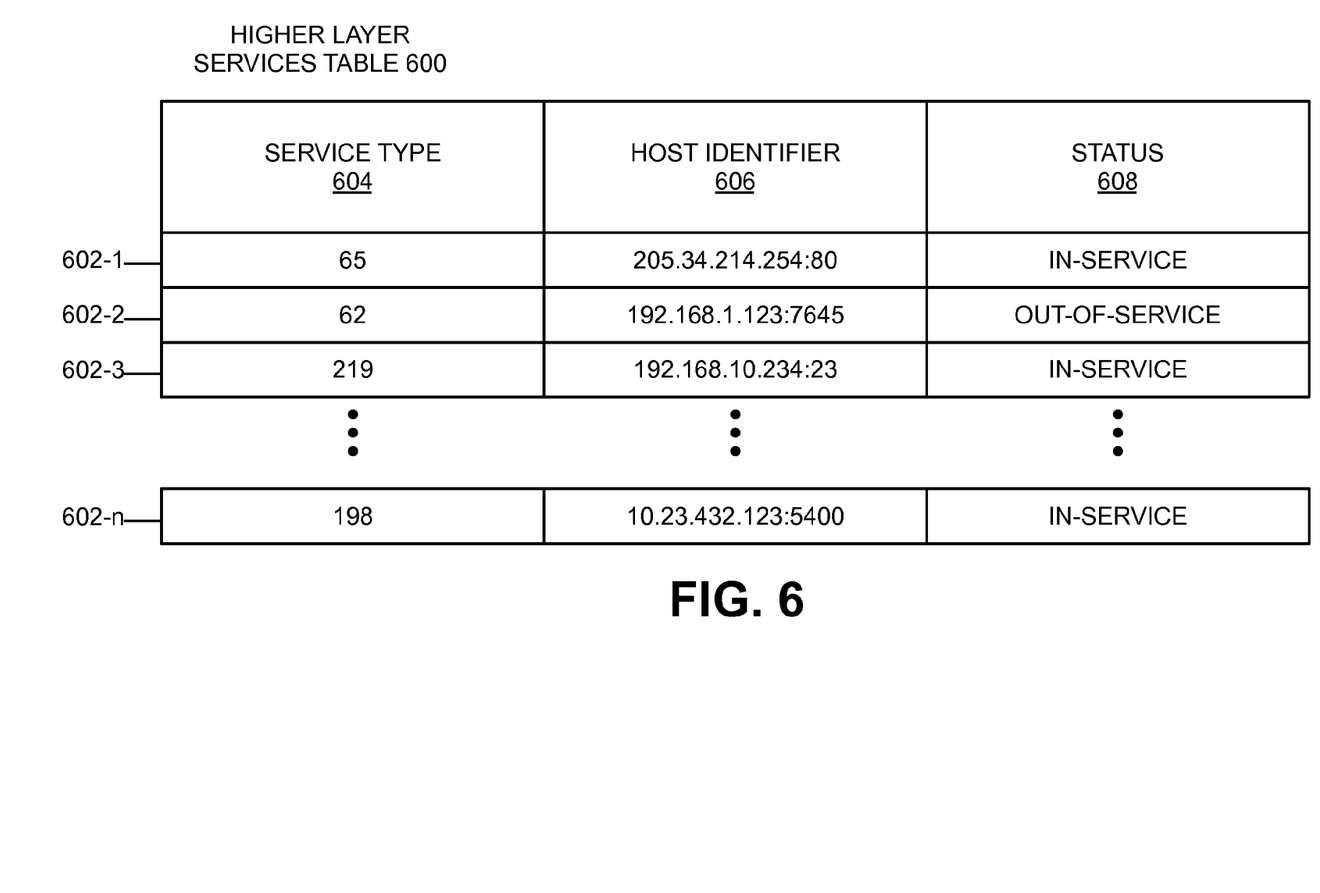
FIG. 6 is a diagram of an exemplary higher layer services table consistent with embodiments described herein.

FIG. 6 is a diagram of an exemplary higher layer services table 600 consistent with embodiments described herein. As shown, higher layer service table 600 may include a plurality of entries 602-1 to 602-n (collectively referred to as "entries 602" and individually as "entry 602"), corresponding to a number of registered higher layer services. Each entry 602 may include a service type field 604, a host identifier field 606, and a status field 608.

Service type field 604 may include information that uniquely identifies a particular higher layer service. For example, each of a number of higher layer services may be assigned a unique identifier code, such as a one octet field capable of supporting up to 255 different higher layer service types. In other embodiments, service type field 604 may include a port number associated with the particular service on the host device.

Host identifier field 606 may include information corresponding to a host device executing or running the particular service. For example, host identifier field 606 may include an IP or MAC address associated with a host device for the service.

Status field 608 may include an identifier indicating a last known status of the service. For example, status field 608 may include an indication of whether the identified service for the identified host device is in-service or out-of-service. In some implementations, status field 608 may include a one bit binary field, where a value of 0 indicates a last known status of in-service and a value of 1 indicates a last known status of out-of-service.

In one exemplary embodiment, a communication channel may be established between management plane 412 and the registered higher layer service during registration of the service. For example, CPE 135 may include a web server device configured to transmit web traffic via hypertext transport protocol (http), which is a layer 7 (application layer) service. Consistent with embodiments described herein, higher layer service registration logic 506, during registration, may identify the http service type (e.g., code 65) and the IP address/port associated with the web server (e.g., 205.34.214.254:80) and may register the service as in service in table 600.

In some implementations, the status of registered services may be periodically updated in table 600. For example, higher layer service registration logic 506 may be configured to periodically determine a status for previously registered services, such as by initiating status queries via higher layer status query generation logic 508, described below. In other implementations, higher layer service registration logic 506 may receive status updates from the host devices. For example, an operating system or registration daemon on host devices may be configured to affirmatively generate and transmit status information either periodically, or upon the occurrence of a predetermined event, such as a termination of a service process or other error or defect condition. In any event, in some implementations, higher layer service registration logic 506 may maintain an updated higher layer services table.

In other implementations, advance registration of higher layer services, e.g., by (or with) higher layer service registration logic 506 is not required. In such an implementation, requests for higher layer service status (as described below) may be received by MEP logic 502, irrespective of any advance knowledge regarding the service. That is, MEP logic 502 may have no a priori knowledge of a service in order to receive and act upon a request for service status message, as described below.

Higher layer status query generation logic 508 may be configured to receive, via a interface associated with MEP logic 502, a request to obtain status information for a far-end higher layer service. For example, MEP logic 502 may be operatively coupled with a network monitoring system configured to request higher layer status information in the event of a disruption in a higher layer service, etc. Alternatively, MEP logic 502 may be configured to receive a user request for such status information.

In any event, upon receipt of a request for higher layer status information for a far end MEP device, higher layer status query generation logic 508 may be configured to generate a higher layer service (HLS) Ethernet OAM packet data unit (PDU), (hereafter referred to as a HLS PDU) that indicates that a status query request for a particular service.

Figure 7A:
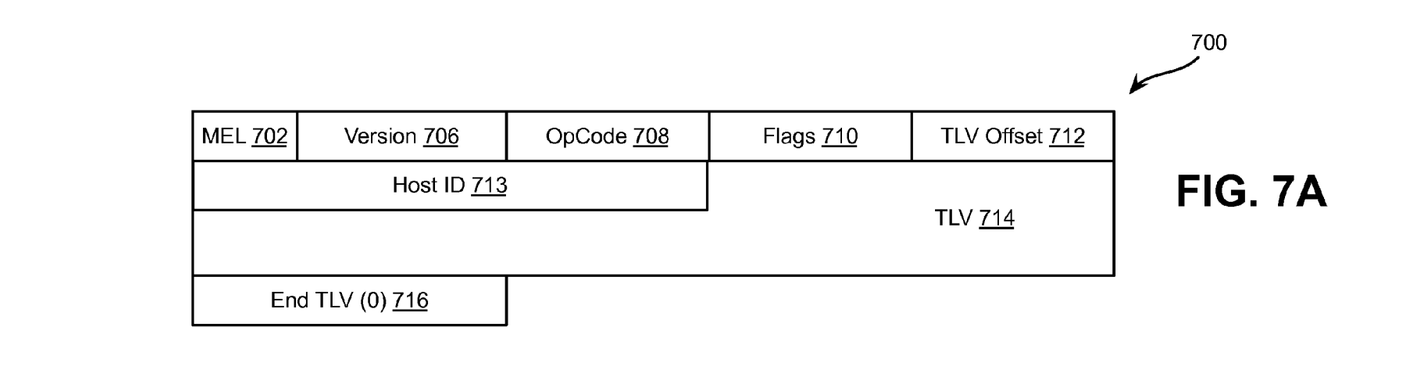
FIG. 7A is a block diagram of an exemplary Ethernet OAM message.

FIG. 7A is a block diagram of an exemplary Ethernet OAM message 700 in one embodiment. As described above, message 700 may be an OAM PDU message. Message 700 may include a MEG level (MEL) field 702, a Version field 706, an OpCode field 708, a Flags field 710, a TLV Offset field 712, a Host ID field 713, a TLV field 714, and an end TLV field 716. MEL field 702 may include a value indicative of a MEL associated with the message. As described in Y.1731, MEG levels 7, 6, and 5 are assigned to customer-level MEGs, MEG levels 4 and 3 are assigned to provider-level MEGs, and MEG levels 2, 1, and 0 are assigned to operator-level MEGs.

Version field 706 may include a value indicative of a version of an applied OAM protocol, e.g., 0 for a present version of Y.1731. OpCode field 708 may include information identifying an OAM PDU type associated with the particular Ethernet OAM message. For example, a continuity check message (CCM) PDU may be identified by an OpCode value of 1. Consistent with embodiments described herein, a new OpCode value may be assigned to HLS PDUs. Currently, OpCode values of 6-32, 34, 36, 38, 44, and 52-255 are not assigned to existing OAM PDU message types.

Flags field 710 may include information relevant to each particular OAM PDU message type. For example, a flag field 710 for CCM PDUs may include information regarding whether a remote defect has been indicated, and period information indicating a transmission interval for subsequent follow-up messages. For HLS PDUs, no dedicated flag field values are necessary. However, in some implementations, information in flags field 710 may be used to identify particular types of higher layer status messages, such as an indication of higher layer status query message, a higher layer response message, etc., as discussed below.

TLV Offset field 712 may contain a value indicative of the offset to the first type, length value (TLV) in an OAM PDU relative to the TLV offset field. This value is associated with each particular OAM PDU type, such as a CCM PDU or a HLS PDU, as described herein. For example, if a value in TLV Offset field 712 is 0, the first TLV in the OAM PDU is the first octet following TLV Offset field 712. In one implementation, TLV Offset field 712 may be set to 12 for HLS PDUs, indicating that the first TLV (if any) is provided in the $13^{th}$ octet following TLV Offset field 712.

Host ID field 713 may include information identifying a host device for a service for which status is requested or provided. For example, Host ID field 713 may include a MAC (e.g., 12 octets) or IP address (e.g., 4 octets) associated with the host device for a requested service.

TLV field 714 includes information used by MEP logic 502 and MIP logic 504 to determine OAM information from the OAM PDU. For example, TLV field 714 may include data information, test information, etc., for use by MEP logic 502/MIP logic 504 in processing a received message. End TLV field 716 may indicate and end of a TLV field 714, so that a processing entity (e.g., MEP logic 502 or MIP logic 504) may recognize that all TLV information has been received.

Figure 7B:
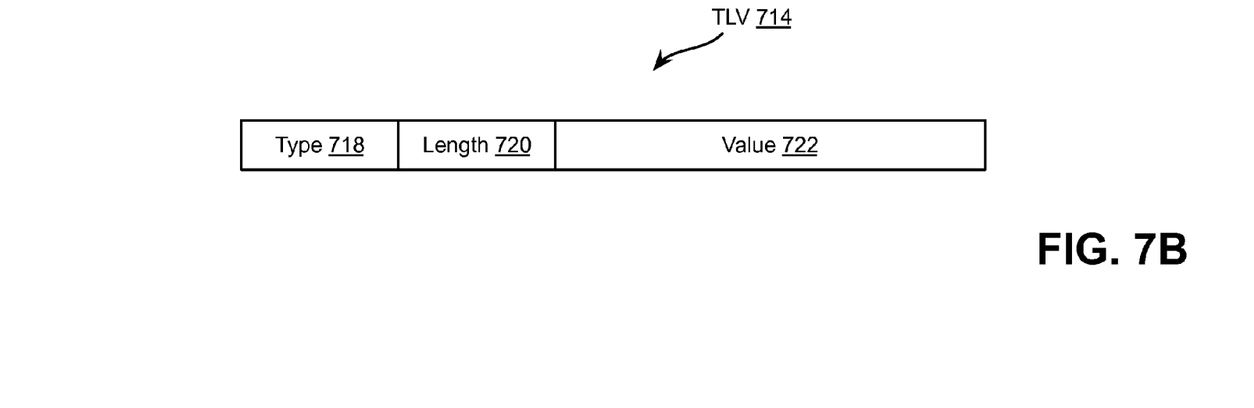
FIG. 7B is a block diagram of the TLV field of FIG. 7A.

FIG. 7B is a block diagram of an exemplary TLV field 714 in one embodiment. As shown, TLV field 714 may include a Type field 718, a Length field 720, and a Value field 722. Type field 718 may include a value indicative of a type of information included or represented by TLV field 714. Consistent with embodiments described herein, one or more new Type fields representing a higher layer status query, response, or notifications may be implemented. Currently, TLV type values of 2, 4, 9-31, and 33-255 are not currently assigned to existing TLV types.

Length field 720 includes a value that indicates a size, or length, of the information in Value field 722. Value field 722 may include data, commands, or other information depending on the type of OAM PDU. In one embodiment consistent with the present description, Value field 722 for a HLS PDUs may include a information relating to a higher layer status query. As described below, in other instances, Value field 722 may be configured to include information indicating a higher layer status response or a higher layer status notification. For example, Value field 722 may include an identifier associated with a particular higher layer service (e.g., a code associated with a registered service) for which status is requested, a responsive indication of an in-service or out-of-service state, etc. In another implementation, rather than including Host ID field 713, Value field 722 in TLV field 714 may include the address or identifier associated with the particular service.

Returning to FIG. 5, higher layer status query generation logic 508 may be configured to include information relating to the particular service and particular host device for which the status is requested into the HLS PDU. The HLS PDU may be transmitted to a far end MEP. Since each MEG includes only a single pair of MEPs, in some instances, it is not necessary to identify, with specificity (e.g., via MAC address) the identity of a receiving or transmitting MEP. Since only MEPs can originate or terminate Ethernet OAM PDUs, actionable PDUs, such as the HLS PDU for higher layer service status queries, may be received and acted on by any receiving MEP.

Higher layer status message identification logic 510 may be configured to receive Ethernet OAM messages, such as an Ethernet OAM packet data unit (PDU)-formatted messages. Higher layer status message identification logic 506 may parse the received Ethernet OAM messages to determine whether the messages include requests, responses, or notifications related to higher layer service status information.

For example, higher layer status message identification logic 510 may be configured to extract information, such as information from OpCode field 708, for a received Ethernet OAM message to determine whether the messages relates to higher layer service status information.

Higher layer status message identification logic 510 may be further configured to extract additional information from HLS PDU, such as in TLV field 714, upon an initial indication that the received OAM message is a HLS PDU. For example, higher layer status message identification logic 510 may determine whether the HLS PDU message is a request for higher layer status, a response to a higher layer status request, or a higher layer service status notification based on a content of Value field 722. Further, higher layer status message identification logic 510 may determine whether the HLS PDU message identifies a particular service for a particular host device.

Higher layer status determination logic 512 may be configured to determine a last known status of the service, such as in response to a determination that the received HLS PDU includes a higher layer status request for a particular service on a particular host by higher layer status message identification logic 510. For example, higher layer status determination logic 512 may be configured to query higher layer services table 600 regarding the value of status field 608 for the last known status of the identified higher layer service. In some implementations, higher layer status determination logic 512 may transmit a query to the respective higher layer service regarding its current status, e.g., via a communication channel between MEP logic 502 and the various host devices, or with a registration or monitoring device (e.g., a firewall, etc.) associated with such devices.

Higher layer status response logic 514 may be configured to generate a higher layer status response message, such as a HLS PDU that includes status responsive information. For example, the HLS PDU generated by higher layer status response logic 514 may include information in TLV field 714 indicative of the status of the identified service on the identified host device. Higher layer status response logic 514 may transmit the generated HLS PDU to the far end MEP, e.g., second MEP CE device 202 at far end interface 130. In one embodiment, information relating to the requested higher layer service and host device are extracted or obtained from the received status request message.

Higher layer status notification logic 516 may be configured to receive status update information and generate a higher layer status notification message, such as a HLS PDU that includes status notification information. For example, higher layer status notification logic 516 may be configured to receive status updates from host devices hosting higher layer services in the event of a status change. In other embodiments, higher layer status notification logic 516 may be configured to generate higher layer status notification messages upon a determination that a status value in table 600 has changed for a particular entry. In some cases, higher layer status notification logic 516 may be configured to receive configuration settings indicating what services and/or hosts should result in status notification messages being generated.

Regarding the format of a higher layer service status notification message, in one example, the HLS PDU generated by higher layer status notification logic 516 may include information in TLV field 614 indicative of the status of an identified service on an identified host device. Higher layer status notification logic 516 may transmit the generated HLS PDU to the far end MEP, e.g., second MEP CE device 202 at far end interface 130.

Unlike the higher layer status response message, status notification messages may be unsolicited by the far end MEP device. Accordingly, higher layer status message identification logic 510 at the receiving MEP device may be configured to respond to the unsolicited message and, for example, generate an alert, log the message, etc.

Figure 8:
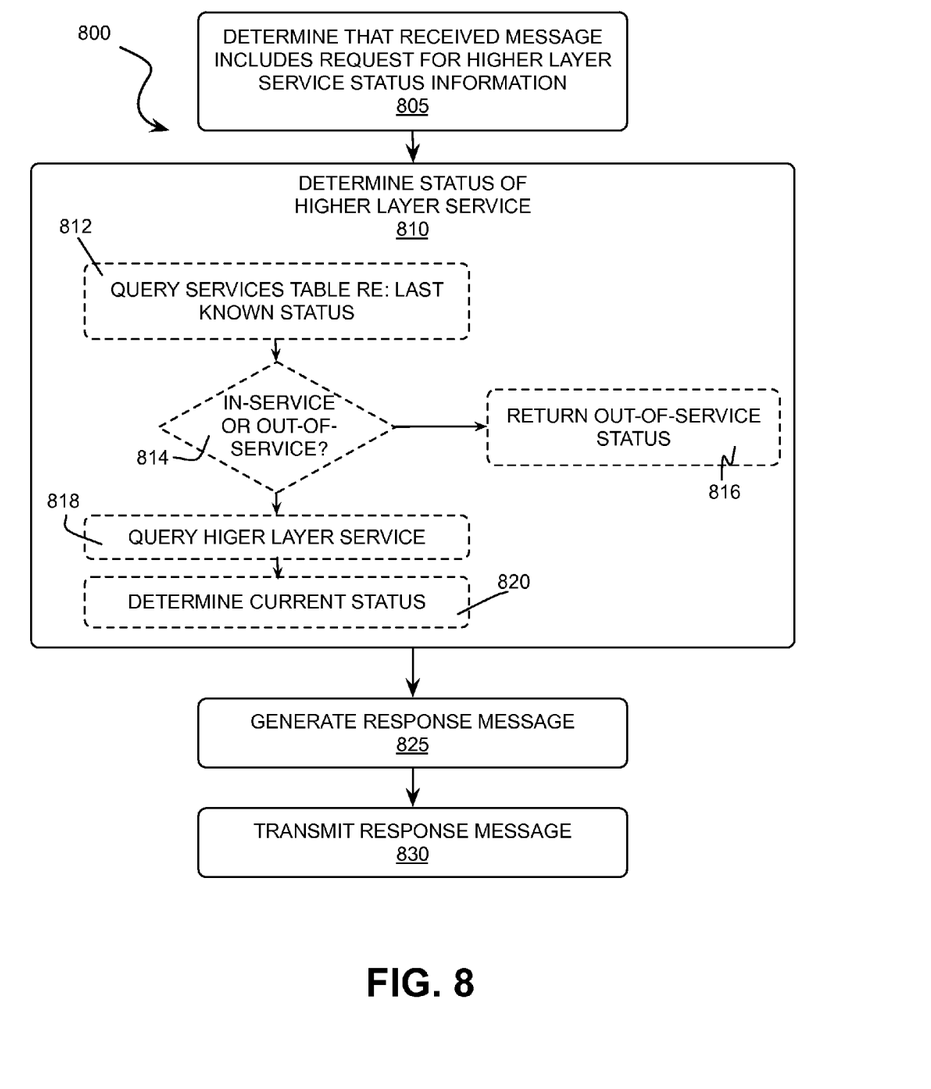
FIG. 8 is a flowchart of a process for responding to a request for higher layer service status information across an EVC.

FIG. 8 is a flowchart of a process 800 for responding to a request for higher layer service status information across an EVC, such as EVC 145. For the purposes of this description, assume that one or more higher layer services have been registered with MEP CE device 202 at interface 125, e.g., by higher layer service registration logic 506. In some implementations, as described above, this registration process may be eliminated, and all higher layer service status requests may be handled in an on-demand manner.

Process 800 is described with respect to FIG. 1, in which a HLS PDU including higher layer service status information is passed from far-end interface 130 to near-end interface 125. As shown in FIG. 8, process 800 may begin with MEP CE device 202 at interface 125 determining that a received message includes a request for higher layer service status information (block 805). For example, higher layer service status message identification logic 510 may parse a received OAM PDU to determine whether the PDU relates to a status request. As described above in relation to FIG. 5, this determination may be based on the content of various fields in the received PDU, such as OpCode field 708, Host ID field 713, and information in TLV field 714. The information may identify the PDU as a HLS PDU, and further identify the location and service for which a status is requested, such as by a service code. In other embodiments, different, fewer, or additional fields in the received OAM PDU may be analyzed to determine that the received PDU includes a request for higher layer status information.

In response to the status request, MEP logic 502 may determine a status of the identified higher layer service (block 810). As indicated by exemplary sub-steps 812-816 in FIG. 8, higher layer status determination logic 512 may initially query higher layer services table 600 regarding a last known status of the identified higher layer service, e.g., based on the host and service identifiers included in the received HLS PDU (block 812). Higher layer status determination logic 512 may determine whether the last known status of the identified higher layer service is out-of-service or in-service (block 814). If the last known status indicates that the identified higher layer service is out-of-service (block 814—OUT-OF-SERVICE), higher layer status determination logic 512 may determine that the current status of the identified service is out of service (block 816).

However, if the last known status indicates that the identified higher layer service is in-service (block 814—IN-SERVICE), higher layer status determination logic 512 may transmit an updated status query to the higher layer service (block 818). For example, higher layer status determination logic 512 may transmit a request to the IP address and port associated with the service to determine whether the service is current in-service or out-of service.

Higher layer status determination logic 512, based on a received response (or lack of response) may determine the current status of the requested higher layer service (block 820). For example, if the higher layer service replies to the status request with an acknowledgement that it is in-service, higher layer status determination logic 512 may set the status of the service as in-service. However, if the higher layer service replies to the status request with an acknowledgement that it is out-of-service, or no acknowledgement/response is received, higher layer status determination logic 512 may set the status of the service as out-of-service.

Based on the information in the received higher layer service status request PDU, and the obtained service status information, a higher layer service status response message may be generated (block 825) and transmitted to MEP CE device 202 at far end interface 130 (block 830). For example, higher layer status response logic 514 may generate a HLS PDU that includes the responsive status information, indicating the service identified in the status request message and the identified status.

Figure 9:
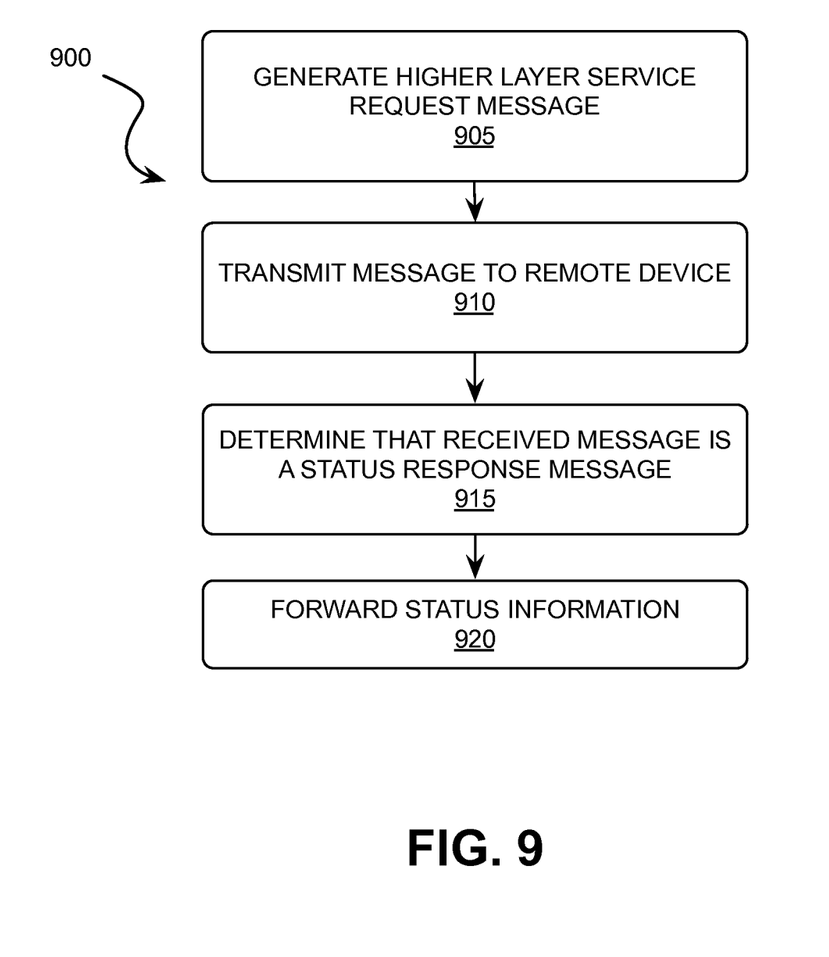
FIG. 9 is a flowchart of a process for requesting higher layer service status information across an EVC.

FIG. 9 is a flowchart of a process 900 for requesting higher layer service status information across an EVC, such as EVC 145. For the purposes of this description, assume that MEP CE device 202 at far end interface 130 has received a request for higher layer status of a particular service, e.g., as identified by a host device address, port number and/or service identifier.

Process 900 may begin with the generation of a HLS status request PDU (block 905). For example, higher layer status query generation logic 508 may received the request, e.g., from a user, a service or network device operating at CPE 140, etc. As noted, the received request may identify the higher layer service for which status is requested based on addressing associated with the host device of the service, etc. The generated HLS status request PDU may be transmitted across EVC 145 to near end MEP device (e.g., MEP CE device 202 at near end interface 125) (block 910).

MEP CE device 202 at far end interface 130 may determine that a received message includes a response to the HLS status request PDU (block 915), e.g., received from MEP CE device 202 at near end interface 125. For example, higher layer service status message identification logic 510 may parse a received OAM PDU to determine that the PDU includes status response information. The responsive information may be forwarded or delivered to a requesting device (block 920). For example, upon receipt of a request for higher layer status information, higher layer status query generation logic 508 may identify and store information regarding the requesting device or user. Upon receipt of the message responsive to the request, higher layer service status message identification logic 510 may retrieve the identification information and forward the received status information to the identified entity.

Systems and methods described herein allow for leveraging of a layer 2 OAM channel to determine and exchange higher layer service status information. This functionality enables devices functionally coupled via layer 2 to ascertain the status of higher layer services, even in situations in which the higher layer services are not operating in a manner that enables the remote devices to communicate via the respective higher layer service. Thus, increased trouble-shooting capabilities are introduced that enable network managers or systems to pinpoint fault locations, thereby increasing the speed with which such issues can be resolved.

As described herein, a layer 2 OAM channel (e.g., a Y.1731 OAM channel) may allow for exchange of OAM PDUs between remote endpoint devices. Consistent with embodiments described herein, specific OAM PDUs, referred to generally as HLS PDUs may be generated and deciphered to initiate requests for and provision of status information for identified higher layer services. The appropriate end point devices may be query the identified higher layer service (or a table including service status information) to determine the status of the identified service. This information may then be encapsulated into an HLS PDU and transmitted back to the requesting end point device. In some implementations, HLS PDUs may be generated as unsolicited notifications forwarding status information regarding higher layer services.

The foregoing description provides illustration and description, but is not intended to be exhaustive or to limit the embodiments to the precise form disclosed. Modifications and variations are possible in light of the above teachings or may be acquired from practice of the invention.

For example, while series of blocks have been described with regard to the flowcharts of FIGS. 8 and 9, the order of the acts may differ in other implementations. Further, non-dependent acts may be performed in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic", a "function," or a "component" that performs one or more functions. Such logic or functions may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computing-device implemented method comprising:
receiving, by a first Ethernet interface, a message from a remote second Ethernet interface via an Ethernet operation, administration, and management (OAM) channel, wherein the Ethernet OAM channel comprises an International Telecommunications Union Y.1731 channel,
determining, by the first Ethernet interface, that the message includes a request for status information regarding an identified higher layer service, wherein the identified higher layer service comprises a service operating on a network layer higher than layer 2, wherein the message comprises an OAM protocol data unit (PDU), and wherein the determining includes:
determining, by the first Ethernet interface, that the received OAM PDU includes at least an indication that the message is a higher layer service message and an identification of the identified higher layer service, and wherein the identification of the identified higher layer service comprises an identity of a host device on which the identified higher layer service is running and an identity of a port number on the host device associated with the identified higher layer service;

determining, by the first Ethernet interface, a current status of the identified higher layer service in response to determining that the message includes the request for status information;

generating, by the first Ethernet interface, a response message to include the current status; and transmitting, by the first Ethernet interface, the response message to the remote second Ethernet interface via the Ethernet OAM channel.

2. The method of claim 1, wherein the first Ethernet interface comprises a first maintenance entity group endpoint (MEP) and the second Ethernet interface comprises a second MEP.

3. The method of claim 1, wherein determining the current status of the identified higher layer service further comprises:
querying, by the first Ethernet interface, a higher layer service table for a last known status of the identified higher layer service,
wherein information in the higher layer service table is populated based on higher layer services registering with the first Ethernet interface.

4. The method of claim 3, further comprising:
determining, by the first Ethernet interface, that the last known status of the identified higher layer service is in-service; and
querying, by the first Ethernet interface, the higher layer service to determining a current status of the identified higher layer service.

5. The method of claim 3, further comprising:
determining, by the first Ethernet interface, that the last known status of the identified higher layer service is out-of-service; and
determining, by the first Ethernet interface, that the current status of the identified higher layer service is out-of-service when the last known status from the higher layer service table is out-of-service.

6. The method of claim 1, wherein determining the current status of the identified higher layer service comprises communicating with a host device running the identified higher layer service.

7. A computing-device implemented method, comprising:
receiving, by a first Ethernet endpoint device, a request for a status of a higher layer service coupled to a remote second Ethernet endpoint device, wherein the higher layer service comprises a service operating on a network layer higher than layer 2;
generating, by the first Ethernet endpoint device, a higher layer service status request message based on the request,
wherein the higher layer service status request message comprises an Ethernet operation, administration, and management (OAM) protocol data unit (PDU),
wherein the higher layer service status request message includes at least an indication that the message is the higher layer service status request message, an indication of the higher layer service, and an identity of a host device on which the higher layer service is running, and
wherein the indication of the higher layer service comprises an identity of a port number on the host device associated with the higher layer service; and
transmitting, by the first Ethernet endpoint device, the higher layer service status request message to the remote Ethernet endpoint device via an Ethernet OAM channel,
wherein the Ethernet OAM channel comprises an International Telecommunications Union Y.1731 channel.

8. The method of claim 7, further comprising:
receiving, by the first Ethernet endpoint device, a response message via the Ethernet OAM channel indicating the current status of the higher layer service.

9. A system comprising:
a network device comprising:
a first interface to receive a message from a remote second Ethernet interface via an Ethernet operation, administration, and management (OAM) channel,
wherein the Ethernet OAM channel comprises an International Telecommunications Union Y.1731 channel and wherein the message comprises an Ethernet OAM protocol data unit (PDU); and
a processor configured to:
determine that the message includes a request for status information regarding an identified higher layer service, wherein the identified higher layer service comprises a service operating on a network layer higher than layer 2, and wherein, when determining that the message includes the request for status information, the processor is further configured to:
determine that the message includes at least an indication that the message is a higher layer service message and an identification of the higher layer service,
wherein the identification of the higher layer service comprises an identity of a host device on which the higher layer service is running and an identity of a port number on the host device associated with the higher layer service;
determine, in response to the message, a current status of the identified higher layer service;
generate a response message to include the current status; and
transmit the response message to the remote second Ethernet interface via the Ethernet OAM channel,
wherein the processor is configured to determine the current status of the identified higher layer service by querying a higher layer service status table or communicating with the identified higher layer service.

10. The system of claim 9, wherein the processor is configured to register a plurality of higher layer services with the network device.

11. A computing-device implemented method, comprising:
determining, by a first carrier-class Ethernet maintenance entity group endpoint (MEP) and in response to receiving a message that includes a request for status information regarding a high layer service, a current status of the higher layer service running on a host device coupled to the first MEP, wherein the higher layer service comprises a service operating on a network layer higher than layer 2, and wherein the message includes at least an indication that the message is a higher layer service message and an identification of the higher layer service, wherein the identification of the higher layer service comprises an identity of the host device and an identity of a port number on the host device;
generating a notification message to include the current status; and
transmitting the notification message to a second MEP remote from the first MEP via an Ethernet operations, administration, and maintenance (OAM) channel, wherein the Ethernet OAM channel comprises an International Telecommunications Union Y.1731 channel,
wherein the determining the current status is in response to an updated status transmitted to the first MEP from the higher layer service.

* * * * *